(12) United States Patent
Xue

(10) Patent No.: US 9,342,758 B2
(45) Date of Patent: May 17, 2016

(54) IMAGE CLASSIFICATION BASED ON VISUAL WORDS

(71) Applicant: Alibaba Group Holding Limited, Grand Cayman (KY)

(72) Inventor: Hui Xue, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 239 days.

(21) Appl. No.: 13/711,500

(22) Filed: Dec. 11, 2012

(65) Prior Publication Data
US 2013/0148881 A1 Jun. 13, 2013

(30) Foreign Application Priority Data

Dec. 12, 2011 (CN) .......................... 2011 1 0412537

(51) Int. Cl.
*G06K 9/62* (2006.01)
*G06K 9/46* (2006.01)
*G06K 9/00* (2006.01)

(52) U.S. Cl.
CPC .......... *G06K 9/6256* (2013.01); *G06K 9/00496* (2013.01); *G06K 9/00536* (2013.01); *G06K 9/00624* (2013.01); *G06K 9/4642* (2013.01); *G06K 9/4676* (2013.01); *G06K 9/62* (2013.01); *G06K 9/6201* (2013.01); *G06K 9/6212* (2013.01); *G06K 9/6215* (2013.01); *G06K 9/6226* (2013.01); *G06K 9/6267* (2013.01)

(58) Field of Classification Search
USPC ......... 382/100, 155, 159, 168, 170, 181, 190, 382/195, 224, 225, 228
See application file for complete search history.

(56) References Cited

U.S. PATENT DOCUMENTS

| 7,394,947 | B2 | 7/2008 | Li et al. |
| 7,532,745 | B2 | 5/2009 | Inoue |
| 8,429,168 | B1 * | 4/2013 | Chechik et al. ............... 707/741 |
| 8,768,048 | B1 * | 7/2014 | Kwatra et al. ............... 382/225 |
| 2007/0005356 | A1 | 1/2007 | Perronnin |
| 2007/0258648 | A1 | 11/2007 | Perronnin |
| 2008/0069456 | A1 | 3/2008 | Perronnin |

(Continued)

OTHER PUBLICATIONS

Jan C. van Gemert, Cor J. Veenman, Arnold W.M. Smeulders, and Jan-Mark Geusebroek, "Visual Word Ambiguity", IEEE Transactions on Pattern Analysis and Machine Intelligence, vol. 32, Issue 7, Jul. 2010, pp. 1271-1283.*

(Continued)

*Primary Examiner* — Eric Rush
(74) *Attorney, Agent, or Firm* — Lee & Hayes, PLLC

(57) ABSTRACT

The present disclosure introduces a method and an apparatus for classifying images. Classification image features of an image for classification are extracted. Based on a similarity relationship between each classification image feature and one or more visual words in a pre-generated visual dictionary, each classification image feature is quantified by multiple visual words in the visual dictionary and a similarity coefficient between each classification image feature and each of the visual words is determined. Based on the similarity coefficient of each visual word that corresponds to different classification image features, a weight of each visual word is determined to establish a classification visual word histogram of the image for classification. The classification visual word histogram is input into an image classifier that is trained by sample visual word histograms arising from multiple sample images. An output result is used to determine a classification of the image for classification.

15 Claims, 8 Drawing Sheets

(56) References Cited

U.S. PATENT DOCUMENTS

| | | | |
|---|---|---|---|
| 2009/0060351 A1 | 3/2009 | Li et al. | |
| 2010/0124377 A1* | 5/2010 | Yu et al. | 382/224 |
| 2011/0116711 A1* | 5/2011 | Wang et al. | 382/165 |
| 2011/0229045 A1* | 9/2011 | Yu | 382/224 |
| 2011/0299764 A1 | 12/2011 | Snoek | |
| 2011/0299789 A1* | 12/2011 | Lin et al. | 382/232 |
| 2011/0317892 A1 | 12/2011 | Greenspan et al. | |
| 2012/0076401 A1* | 3/2012 | Sanchez | G06K 9/4676 382/159 |
| 2012/0148095 A1 | 6/2012 | Okamoto et al. | |
| 2012/0230546 A1 | 9/2012 | Hua et al. | |
| 2013/0089304 A1 | 4/2013 | Jiang et al. | |
| 2013/0114900 A1 | 5/2013 | Vedantham et al. | |

OTHER PUBLICATIONS

B.W. Silverman, "Density Estimation for Statistics and Data Analysis", Monographs on Statistics and Applied Probability, 1986, pp. 1-22.*

Jinjun Wang, Jianchao Yang, Kai Yu, Thomas Huang, and Yihong Gong, "Locality-constrained Linear Coding for Image Classification", IEEE, Conference on Computer Vision and Pattern Recognition, Jun. 2010, pp. 3360-3367.*

Hervé Jégou, Matthijs Douze and Cordelia Schmid, "On the burstiness of visual elements", IEEE, Conference on Computer Vison and Pattern Recognition, Jun. 2009, pp. 1169-1176.*

Boureau, et al., "Ask the locals: multi-way pooling for image recognition", IEEE International Conference on Computer Vision (ICCV), Nov. 6, 2011, pp. 2651-2658.

Liu, et al., "In Defense of Soft-assignment Coding", IEEE International Conference on Computer Vision (ICCV), Nov. 6, 2011, pp. 2486-2493.

The PCT Search Report mailed Mar. 19, 2013 for PCT application No. PCT/US12/69006, 13 pages.

Philbin, et al., "Lost in Quantization: Improving Particular Object Retrieval in Large Scale Image Databases", IEEE Conference on Computer Vision and Patter Recognition (CPVR), Jun. 23, 2008, pp. 1-8.

Silverman, "Density Estimation for Statistics and Data Analysis", retrieved from the internet on Mar. 15, 2002 at http://gemini.econ.umd.edu/jrust/econ623/lectures/silverman_density_estimation.pdf, Jan. 1, 1986, pp. 1-22.

Van Gemer, et al., "Visual Word Ambiguity", Transactions on Pattern Analysis and Machine Intelligence, IEEE, vol. 30, No. 7, Jul. 1, 2010, pp. 1271-1283.

The European Office Action mailed Aug. 17, 2015 for European patent application No. 12808614.7, a counterpart foreign application of U.S. Appl. No. 13/711,500, 3 pages.

* cited by examiner

IMAGE CLASSIFICATION BASED ON VISUAL WORDS

CROSS REFERENCE TO RELATED PATENT APPLICATIONS

This application claims foreign priority to Chinese Patent Application No. 201110412537.5 filed on 12 Dec. 2011, entitled "Image Classification Method and Apparatus," which is hereby incorporated by reference in its entirety.

TECHNICAL FIELD

The present disclosure relates to the field of image processing technology and, more specifically, to a method and an apparatus for classifying images.

BACKGROUND

Image classification is an image processing technology that determines classifications based on different characteristics reflected by different images and classifies the images. With the explosion of images on the Internet, the e-commerce field includes a large volume of image information. With image classification, contrabands may be detected and the same type of products may be recommended. Thus, image classification technology is becoming a study focus.

Existing image classification methods generally, based on a pre-generated visual dictionary, represent an image for classification as a visual word for classification histogram, and then determine a classification of the image for classification by an image classifier that is generated based on pre-training. The visual dictionary includes different visual words. Each visual word represents a classification that is obtained through clustering of training image features extracted from a large volume of training images. The histogram of the visual word for classification is a dataset formed by multiple data and is represented by a vector. Each data maps onto a corresponding visual word. Each data value is equal to a weight of the corresponding visual word. The weight represents a similarity degree between a respective image for classification and the classification represented by the corresponding visual word. The image classifier is generated through training by a machine-learning algorithm based on visual word histograms corresponding to each training image. A respective visual word histogram corresponding to a respective training image is also formed in a same method by representing the image for classification as the histogram of the visual word for classification.

The process to represent the image for classification as the histogram of the visual word for classification is as follows. Based on a respective image feature of the image for classification, a visual word in the visual dictionary that is closest to the respective image feature is determined and the respective image feature is quantified as such visual word. Each time the visual word in the visual dictionary is used for quantification, its corresponding weight is increased by 1. When all respective image features are quantified by visual words, the weight of each visual word is also determined to establish the histogram of the visual word for classification. For example, the visual dictionary may be represented as B={b1, b2, b3}, the extracted image features may include X1 and X2, and the corresponding visual word histogram may be represented as C={c1, c2, c3}, where initial values of c1, c2, and c3 are 0. When X1 is determined to be closest to visual word b1, the value of corresponding c1 is increased by 1. If X2 is also determined to be closest to visual word b1, the value of corresponding c1 is also increased by 1. Accordingly, the final established histogram of the visual word for classification corresponding to the image for classification is represented as {2, 0, 0}.

As shown above, the process to establish the histogram of the visual word for classification is to quantify each feature of the image for classification as a visual word. In real applications, the visual word obtained through quantification may not accurately represent the feature of the image to be classified. In addition, quantification error may easily arise when there is an image distortion. For example, the image feature X1 may be closest to b2, under the current method, the image feature X1, however, may be still quantified by the visual word b1. Thus, the established visual word histogram may not be accurate and have errors, which leads to an inaccurate image classification.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method for classifying images and an apparatus for classifying images that may be used to implement the method for classifying images.

The present disclosure provides the method for classifying images. Classification image features of an image for classification are extracted. Based on a similarity relationship between each classification image feature and one or more visual words in a pre-generated visual dictionary, each classification image feature is quantified by multiple visual words in the visual dictionary and a similarity coefficient between each classification image feature and each of the visual words is determined. Based on the similarity coefficient of each visual word that corresponds to different classification image features, a weight of each visual word is determined to establish a classification visual word histogram of the image for classification. The classification visual word histogram is input into an image classifier that is trained by sample visual word histograms arising from multiple sample images. An output result is used to determine a classification of the image for classification.

There are different techniques that each classification image feature is quantified by multiple visual words in the visual dictionary and the similarity coefficient between each classification image feature and each of the visual words is determined. For example, based on the similarity relationship between each classification image feature and the one or more visual words in the pre-generated visual dictionary, through a sparse coding method, a sparse coding model between the classification image feature and the pre-generated visual dictionary is established. The sparse coding model may be used to quantify each classification image feature by multiple visual words in the visual dictionary and obtain the similarity coefficient between each classification image feature and the visual words after quantification.

For instance, an example sparse coding model may be as follows:

$$\arg_C{}^{min} \Sigma_{i=1}^{N} \|X_i - BC_i\| + \lambda \|C_i\|_{l^1}$$

where, B represents the visual dictionary, $X_i$ represents a respective classification image feature. $C_i$ represents a dataset formed by coefficients between the respective classification image feature and each visual word. N represents a number of classification image features. i=1, 2, ..., N, where N may be any integer. λ represents a constraining coefficient. $\|C_i\|_{l^1}$ represents a sum of all elements in $C_i$. The sparse coding model is used to calculate a value of $C_i$ when the model has a minimum value.

For another example, based on the similarity relationship between each classification image feature and the visual words in the pre-generated visual dictionary, a Euclidean distance between each classification image feature and each visual word is calculated. With respect to each classification image feature, one or more visual words of which Euclidean distances are within a preset times range of a smallest Euclidean distance are determined as the visual words of the respective classification image feature after quantification. Based on the Euclidean distance between the respective classification image feature and each of the visual words after quantification, the coefficient between the respective classification image feature and the visual words after the quantification is calculated.

There are different techniques that a weight of each visual word is determined to establish a classification visual word histogram of the image for classification. For example, the coefficients of the respective visual word that correspond to different classification image features may be added to calculate the weight of the respective visual word to establish the classification visual word histogram.

For another example, the image for classification may be divided into multiple child images based on a pyramid image algorithm. Classification image features of each child image are determined. The coefficients of a respective visual word that correspond to each classification image features in a child image may be added to calculate the weight of the respective visual word corresponding to the child image to establish a child classification visual word histogram of the child image. Based on each child classification visual word histogram of each child image, the classification visual word histogram of the image for classification is established.

There are different techniques to divide the image for classification into the multiple child images based on the pyramid image algorithm. For example, the image for classification may be divided into multiple layer images based on the pyramid image algorithm. Each layer image is divided to form multiple child images.

There are different techniques for generation of the pre-generated visual dictionary. For example, the pre-generated visual dictionary may be generated through clustering of multiple sample image features extracted from multiple sample images.

The present disclosure also provides an apparatus for classifying images. The apparatus for classifying images may include a feature extraction module, a quantification determination module, an establishment module, and a classification module.

The feature extraction module extracts classification image features of an image for classification. The quantification determination module, based on a similarity relationship between each classification image feature and one or more visual words in a pre-generated visual dictionary, quantifies each classification image feature by multiple visual words in the visual dictionary and determines a similarity coefficient between each classification image feature and each of the visual words after the quantification. The establishment module, based on the similarity coefficient of each visual word that corresponds to different classification image features, determines a weight of each visual word to establish a classification visual word histogram of the image for classification. The classification module inputs the classification visual word histogram into an image classifier that is trained by sample visual word histograms arising from multiple sample images and determines a classification of the image for classification based on an output result.

The quantification determination module may include different components in different embodiments. For example, the quantification determination module may include a model construction module and a quantification calculation module. The model construction module, based on the similarity relationship between each classification image feature and the one or more visual words in the pre-generated visual dictionary, through a sparse coding method, establishes a sparse coding module between the classification image feature and the pre-generated visual dictionary. The quantification calculation module uses the sparse coding model to quantify each classification image feature into multiple visual words in the visual dictionary and obtain the similarity coefficient between each classification image feature and the visual words after quantification.

For instance, the sparse coding model may be as follows:

$$\arg_C{}^{min} \Sigma_{i=1}^{N} \|X_i - BC_i\| + \lambda \|C_i\|_{l^1}$$

Where, B represents the visual dictionary, Xi represents a respective classification image feature, Ci represents a dataset formed by coefficients between the respective classification image feature and each visual word, N represents a number of classification image features. i=1, 2, ..., N, where N may be any integer, and λ represents a constraining coefficient. $\|C_i\|_{l^1}$ represents a sum of all elements in $C_i$. The sparse coding model is used to calculate a value of Ci when the model has a minimum value.

For another example, the quantification determination module may also include a first calculation module, a quantification module, and a second calculation module. The first calculation module, based on the similarity relationship between each classification image feature and the visual words in the pre-generated visual dictionary, calculates a Euclidean distance between each classification image feature and each visual word. The quantification module, with respect to each classification image feature, determines one or more visual words of which Euclidean distances are within a preset times range of a smallest Euclidean distance as the visual words of the respective classification image feature after quantification. The second calculation module, based on the Euclidean distance between the respective classification image feature and each of the visual words after quantification, calculates the coefficient between the respective classification image feature and the visual words after the quantification.

There are different examples of the establishment module. For example, the establishment module may add the coefficients of the respective visual word that correspond to different classification image features to calculate the weight of the respective visual word to establish the classification visual word histogram.

For another example, the establishment module may include a division module, a first establishment module, and a second establishment module. The division module divides the image for classification into multiple child images based on a pyramid image algorithm. The first establishment module determines classification image features of each child image, adds the coefficients of a respective visual word that correspond to each classification image features in a child image, and calculates the weight of the respective visual word corresponding to the child image to establish a child classification visual word histogram of the child image. The second establishment module, based on each child classification visual word histogram of each child image, establishes the classification visual word histogram of the image for classification.

The division module may include different components in different embodiments. For example, the division module may include an image layer division module and a child image division module. The image layer division module divides the image for classification into multiple layer images based on the pyramid image algorithm. The child image division module divides each layer image into multiple child images.

There are different techniques for generation of the pre-generated visual dictionary. For example, the pre-generated visual dictionary may be generated through clustering of multiple sample image features extracted from multiple sample images.

The present techniques quantify the classification image features of the image for classification into multiple visual words, determine the coefficients of the determined classification image features and the visual words after quantification, and establish the classification visual word histogram based on the coefficients. The classification image features are quantified by multiple visual words and the similarity coefficients represents similarity degrees between the classification image feature and the visual words after quantification. On one hand the established visual word histogram may more accurately represent the image for classification. On the other hand, even if the image has distortions, as the image feature is not limited to be quantified as one visual word and may be quantified as multiple visual words, the classification error arising from quantification error may be reduced and the accuracy of image classification may be improved.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure and shall not be used to restrict the present disclosure. A person of ordinary skill in the art can obtain other figures according to the figures in the present disclosure without creative efforts.

DETAILED DESCRIPTION

The present disclosure provides a method and an apparatus for searching and classifying images. The present techniques may improve the utilization rate of server resources. The present techniques may be applied in the process of image searching and be implemented either as a method or an apparatus. The following is a detailed description of the present techniques by reference to the FIGURES. The described embodiments herein are example embodiments and should not be used to restrict the scope of the present disclosure.

The present techniques may be described in a context of computer-executable instructions performed by computers, such as program modules. Generally, the program modules include instances, programs, objects, components, and data structures that implement specific tasks or realize specific abstract data types. The present techniques may also be implemented in a distribution computing environment. In the distribution computing environment, remote devices connected by communication networks are used to implement tasks. In the distribution computing environment, the program modules may be stored on local and remote computer storage media including storage devices.

In one example embodiment of the present disclosure, classification image features of an image for classification are extracted. Each classification image feature is quantified by multiple visual words in a pre-generated visual dictionary. Similarity coefficients between the classification image features and the visual words after quantification are determined. Based on the similarity coefficients of each visual word corresponding to different classification image features, the weight of the visual word is determined to establish the classification visual word histogram. The classification visual word histogram is input into an image classifier that is trained by sample visual word histograms arising from multiple sample images. An output result is used to determine a classification of the image for classification. Thus, the image classification is implemented. Each classification image feature may be quantified by multiple visual words and represented by multiple visual words, thereby improving the accuracy of representing classification image features by visual words. Thus, the established classification visual word histogram may accurately represent the image for classification and the accuracy of image classification is improved. In addition, as multiple visual words are used to represent the classification image features, the classification error arising from quantification error may be reduced and the accuracy of image classification may be improved.

Figure 1:
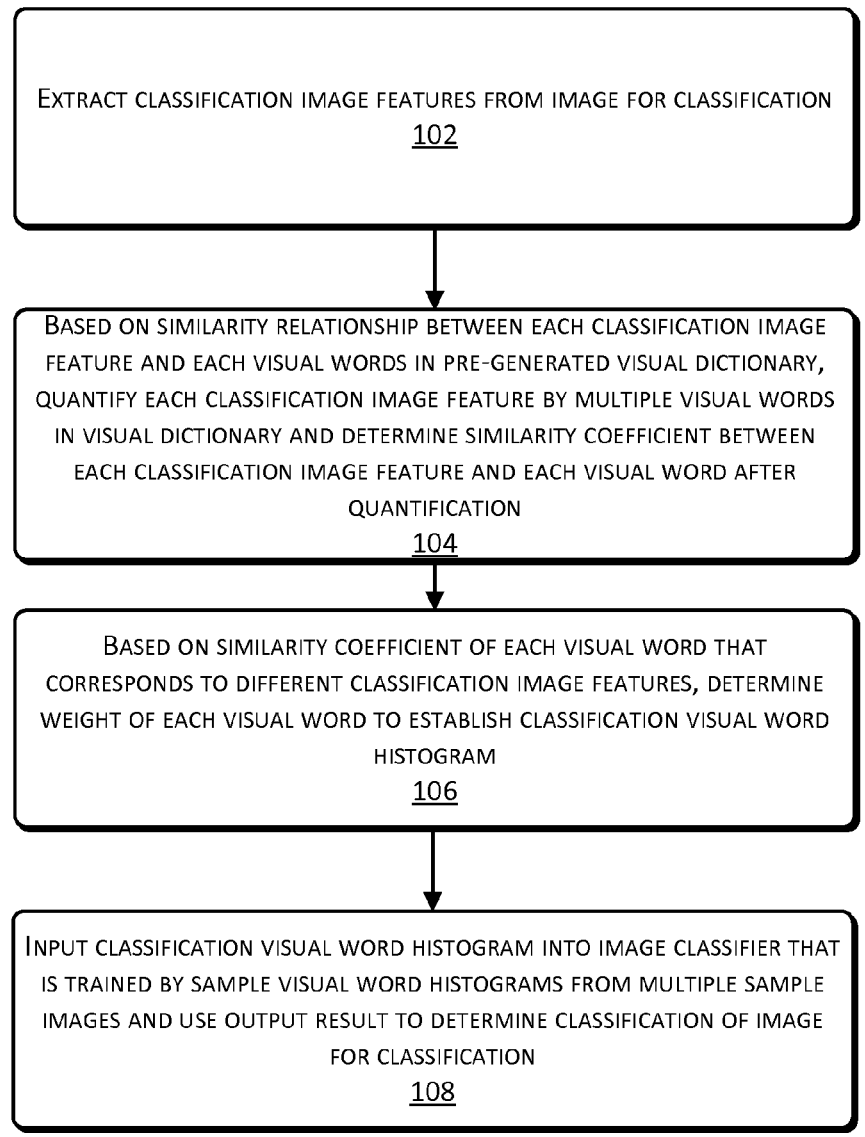
FIG. 1 illustrates a flowchart of an example method for classifying images in accordance with a first example embodiment of the present disclosure.

FIG. 1 illustrates a flowchart of an example method for classifying images in accordance with a first example embodiment of the present disclosure. At 102, one or more classification image features from an image for classification are extracted. When there is a need to classify images, images for classification are used as inputs and the classification image features are extracted from each image for classification. For example, the classification image features may be image regional features such as scale-invariant feature transform (SIFT) features extracted by a SIFT algorithm. The SIFT features have scale, rotation invariance, viewpoint change, affine change, and noises that also maintain certain extent of stability. For another example, the present techniques may use other algorithms to extract the image regional features with different characteristics, such as HAAR features, HOG features, etc. The present disclosure does not impose limitations on the extraction of the image regional features.

In some applications, the image features may be represented in a form of a vector. For instance, five image features may be extracted from an image and each image feature represents a three-dimensional vector, such as (1, 1, 1), (2, 2, 2), (1, 1, 2), (3, 3, 3), (2, 1, 3). A number of extracted image features may be relevant to vector dimensions of each feature and specific feature extraction algorithm and image size. For an example of extraction of SIFT features, the vector dimensions of the SIFT features usually have 128 dimensions. 500-10000 128-dimensions image features may be extracted from an image with 800*600 resolutions.

At 104, based on a similarity relationship between each classification image feature and one or more visual words in a pre-generated visual dictionary, each classification image feature is quantified by multiple visual words in the visual dictionary and a similarity coefficient between each classification image feature and each of the visual words after quantification is determined. For example, the present techniques may use a method for classifying images based on the visual dictionary and represent the image for classification as a visual word histogram. The visual dictionary may include different visual words and each visual word represents a type of features that is clustered through sample image features extracted from a large volume of sample images. An example operation may be as follows.

First, the sample image features are extracted from the sample images. The sample images are sample images with labeled classifications. The operations to extract features may be same as or similar to the operations at 102.

Based on a preset number of visual words in the visual dictionary, the extracted image features are clustered by a clustering method. Values of the cluster center are the visual words.

For example, there may be 10 sample images with labeled classifications. The sample images may include multiple classifications, such as vehicles, landscapes, etc. If 100 features are extracted from each image, totally 1,000 sample image features are extracted. If the preset number of visual words in the visual dictionary is 10, the clustering method is used to cluster the 1,000 images to form the visual dictionary with 10 visual words. The 10 visual words may represent specific classifications, such as tires, leaves, etc. The clustering is a process to classify a set of physical or abstract objects into multiple classifications formed by similar objects. The clustering centers are the visual words of the visual dictionary that are calculated by the clustering method based on multiple features. The clustering method, for example, may use the K-means algorithm. Thus, each visual word is also a multiple-dimension vector and its dimensions are the same as the dimensions of the image features.

As both the image features and the visual words may be represented by vectors, each classification image feature may have the following similar relationship with the visual words in the visual dictionary, which may be expressed in a linear formula such as $X_i \approx B*C_i$.

$X_i$ represents a respective image feature, B represents the visual dictionary, and $C_i$ represents a dataset composed of coefficients between each classification image feature and each visual word. The dataset formed by $C_i$ may be represented in a form of a vector and has a one-to-one mapping relationship with the visual dictionary. For instance, the visual dictionary may be represented by B={b1, b2, b3, b4}, its corresponding $C_i = \{C_{i1}, C_{i2}, C_{i3}, C_{i4}\}$. Thus, $X_i \approx b1*C_{i1} + b2*C_{i2} + b3*C_{i3} + b4*C_{i4}$.

If the visual words corresponding to X1 after quantification are b1, b3, and b4, and their respective coefficients with $X_1$, i.e., $C_{11}$, $C_{13}$, and $C_{14}$, are 0.6, 0.3, 0.1. The combination of similarity coefficients between the respective classification image feature and each visual word is represented as {0.6, 0, 0.3, 0.1}. The similarity coefficient represents a similar degree between each classification image feature and each visual word. There are various methods for quantifying each classification image features by multiple visual words and determining the similarity coefficients between the respective classification image feature and the visual words after quantification. Some example methods are described in detail below.

At 106, based on the similarity coefficient of each visual word that corresponds to different classification image features, a weight of each visual word is determined to establish a classification visual word histogram. From the operations at 104, with respect to each classification image feature, the similarity coefficients with the visual words after quantification may be calculated. That is, each visual word has corresponding similarity coefficients with different classification image features. Based on the coefficients of the visual word that corresponds to different classification image features, the weight of the visual word is determined and the classification visual word histogram of the image for classification may be established.

There are various methods to determine the weight of the visual word to establish the classification visual word histogram. For example, all of the similarity coefficients of a visual word that corresponding to different classification image features are added and the sum is used as the weight of the visual word. A dataset is composed of the weights of the visual words and a multi-dimension vector is thus formed, which may represent the classification visual word histogram of the image for classification.

For instance, three classification image features such as X1, X2, and X3 may be extracted from the image for classification. The visual dictionary may include 4 visual words such as b1, b2, b3, and b4. The similarity coefficients between the feature X1 and each visual word are {0.6, 0, 0.3, 0.1}. The similarity coefficients between the feature X2 and each visual word are {0.2, 0.4, 0.3, 0.1}. The similarity coefficients between the feature X3 and each visual word are {0.2, 0.2, 0.3, 0.3}. That is, all similarity coefficients corresponding to the visual word b1 are 0.6, 0.2, and 0.2. Such similarity coefficients are added up to obtain the weight of b1 as 1. By similar operations, the weight of the visual word b2 is 0.6, the weight of the visual word b3 is 0.9, and the weight of the visual word b4 is 0.5. As the classification visual word histogram is the dataset composed of the weights of different visual words. The finally established classification visual word histogram is {1, 0.6, 0.9, 0.5}.

For another example, the image for classification is classified into multiple child images. The weight of visual words corresponding to each child image in the visual dictionary is firstly calculated to establish the child classification visual word histograms of the child images. Then each child classification visual word histogram is combined to form the classification visual word histogram. Example operations are described in detail below.

The numeric values of the similarity coefficients may be used to represent the similar degrees between the classification image features and the various visual words. The similarity coefficients may take the form of other types of values as long as the percentage of the similarity coefficients remains the same.

At 108, the classification visual word histogram is input into an image classifier that is trained by sample visual word histograms from multiple sample images. An output result is used to determine a classification of the image for classification.

The image classifier is a machine model that automatically determines classifications of images after machine-learning. For example, the image classifier may be a vector-support machine model, a decision tree model, etc. The pre-generated image classifier is based on multiple sample images, uses a machine-learning algorithm, and generates a corresponding classification model to implement image classification.

The pre-generated image classifier is generated through training based on sample visual word histograms established based on a large volume of sample images. For example, the operations to establish the sample visual word histograms may be the same as the operations to establish the visual word histogram of the image for classification to implement the image classification. The following is an example generation process of the image classifier.

At a first step, based on a similarity relationship between each sample image feature and visual words in a pre-generated visual dictionary, each sample image feature is quantified by multiple visual words in the visual dictionary and a similarity coefficient between each sample image feature and each of the visual words after quantification is determined. As shown in 104, the visual dictionary is generated through clustering sample image features extracted from a large volume of sample images. The image classifier is also generated through training of the sample images.

Based on classifications of the selected sample images, the image classifier is trained to include classifiers for different types. For example, the sample images may include vehicles, landscapes, and people. The finally generated image classifier may be a three-type classifier to implement classifications of the images into a vehicle classification, a landscape classification, and a people classification.

Each sample image feature is quantified by multiple visual words and the coefficients between each sample image feature and the visual words after quantification is calculated. For example, such operations are the same as the operations to calculate the coefficients between the classification image features and the visual words.

At a second step, based on the similarity coefficient of each visual word that corresponds to different sample image features, a weight of each visual word is determined to establish a sample visual word histogram.

At a third step, based on each sample visual word histogram, a machine learning algorithm is used to generate the image classifier through training.

After the sample visual word histogram for each sample image is established, through the machine learning, the image classifier is generated.

The classification visual word histogram is input into the image classifier generated through the above operations. The classification of the image is determined based on the output result of the image classifier. If the image classifier after training is a three-type classifier, the output result includes A, B, or C. For instance, A may represent a vehicle type, B may represent a tree type, and C may represent a people type. If the output result is A, the image belongs to the vehicle-type images.

There may be a large volume of images for classification. The classification process may be applied to each of the images for classification according to the above operations to implement the classification of the large volume of images for classification.

In this example embodiment of the present disclosure, each classification image feature is quantified by multiple visual words and similarity coefficients between each classification image feature and the visual words after quantification are determined. The visual word histogram is established based on different similarity coefficients of each visual word. As each classification image feature may be used to quantify multiple visual words such that one classification image feature may be represented by multiple visual words, the accuracy of the classification image feature represented by the visual words is improved. Thus, the established classification visual word histogram may more accurately represent the image for classification, thereby improving the accuracy of image classification. In addition, as multiple visual words are used to represent the classification image feature, the classification error arising from quantification error may be reduced and the accuracy of image classification may be improved.

Figure 2:
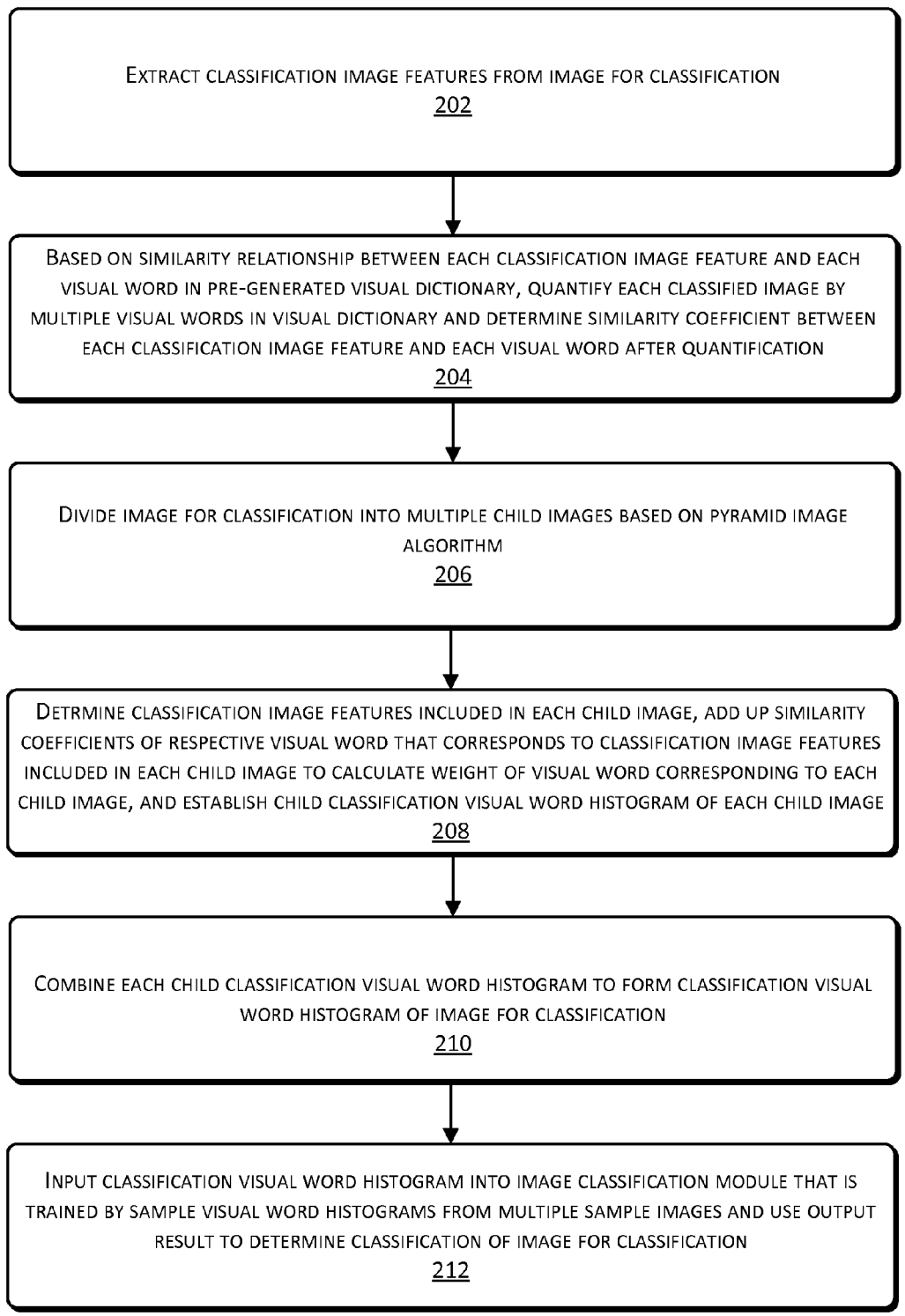
FIG. 2 illustrates a flowchart of another example method for classifying images in accordance with a second example embodiment of the present disclosure.

FIG. 2 illustrates a flowchart of another example method for classifying images in accordance with a second example embodiment of the present disclosure.

At 202, one or more classification image features of an image for classification are extracted.

At 204, based on a similarity relationship between each classification image feature and one or more visual words in a pre-generated visual dictionary, each classification image feature is quantified by multiple visual words in the visual dictionary and a similarity coefficient between each classification image feature and each of the visual words after quantification is determined.

At 206, the image for classification is divided into multiple child images based on a pyramid image algorithm. In order that the visual word histogram may represent space information of the image for classification, in this example embodiment, the image for classification is divided by spaces. The image for classification is divided into multi-layer space sub-regions. Each layer space sub-region is a space image. Each layer space image is further divided into multiple child images.

In this example embodiment, the image for classification is divided by the pyramid image algorithm. For example, an M-layer pyramid image algorithm may be used to divide an original image into M layer space images. Each space image may be divided into child images by $4^N$, where N=0, 1, 2, ..., M−1. The first layer space image is divided by $4^0$ to form one child layer image. The second layer space image is divided by $4^1$ to form 4 child images. The third layer space image is divided into 16 child images. The $M^{th}$ layer space image is divided into $4^{M-1}$ child images. The value of M and N may be determined in accordance with actual situations.

After the image for classification is divided into multi-layer space images, each layer space image includes extracted classification image features. After the child images are divided, the classification image features are also divided accordingly. For example, the extracted classification image features may include X1, X2, X3, X4, and X5. The first layer space image includes one child image that includes the 5 classification image features. The second layer space image includes 4 child images. For instance, the features X1 and X2 may locate in a first child image of the second layer space image. The features X3, X4, and X5 may locate in a second child image of the second layer space image. The third and the fourth child image may not include the classification image features. The third layer space image is divided into 16 child images. Each classification image feature may locate in different child images of the third layer space image.

At 208, the classification image features included in each child image are determined. The similarity coefficients of a respective visual word that corresponds to the classification image features included in each child image are added up to calculate a weight of the visual word corresponding to each child image and a child classification visual word histogram of each child image is established.

As shown in 206, after the image division, the classification image features included in different child images at different layers are different. The extracted classification image features included in each child image are firstly determined. Then the child classification visual word histogram of each child image is established. The child weights of the visual words corresponding to each child image are calculated. The child weights of the visual words are used as data of the visual word histogram to establish the child classification visual word histogram.

At 210, each of the child classification visual word histograms is combined to form a classification visual word histogram of the image for classification. As the child classification visual word histogram includes data values from multiple data and is represented by a vector, the combination of each of the child classification visual word histograms is to combine data of each child classification visual word histogram to form a high-dimensional vector.

An example operation process to establish the classification visual word histogram is as follows.

For example, 3 classification image features represented by X1, X2, and X3 are extracted from the image for classification. The visual dictionary includes 4 visual words represented by b1, b2, b3, and b4. After operations at 204, a first similarity coefficient between the features X1, X2, X3 and the visual words b1, b2, b3, b4 respectively is calculated. For instance, a combination of the first similarity coefficients corresponding to X1 is {0.6, 0, 0.3, 0.1}, a combination of the first similarity coefficients corresponding to X2 is {0.2, 0.4, 0.3, 0.1}, and a combination of the first similarity coefficients corresponding to X3 is {0, 0, 0.3, 0.7}.

Assuming that a 2-layer pyramid image algorithm is used to divide the image and the second layer space image is divided to include 4 child images. With respect to the first layer space image, the established first child visual word histogram is {0.8, 0.4, 0.9, 0.9}. With respect to the second layer space image, assuming that the classification image features X1 and X2 locate at a first child image divided in the second layer space image and X3 locates at a second child image divided in the second layer space image, the first child visual word histogram of each child image is {0.8, 0.4, 0.6, 0.2}, {0, 0, 0.3, 0.7}, {0, 0, 0, 0}, {0, 0, 0, 0} respectively.

Each of the first child visual word histograms is represented by a 4-dimensional vector. After the combination of each of the first child visual word histograms, the finally formed classification visual word histogram is {0.8, 0.4, 0.9, 0.9, 0.8, 0.4, 0.6, 0.2, 0, 0, 0.3, 0.7, 0, 0, 0, 0}, which is a 20-dimension vector.

It should be noted that the values in the above examples are for the brevity of description and may not be the specific values in actual applications. In a real application, the visual dictionary may include a large volume of visual words. There is also a large volume of classification image features extracted from each image for classification. Each classification image feature may generally be a high-dimensional vector. Due to the limitation of paragraphs, the examples in the present disclosure are for the purpose of exemplary illustration only.

The division of layers of the image and the child image increases the space information of the image features or the location relationships between different feature points. Each child image may be represented by the child classification visual word histogram. The finally formed classification visual word histogram increases space information of the image for classification. Thus, the classification visual word histogram more accurately represents the image for classification, thereby further improving the accuracy of image classification.

At 212, the classification visual word histogram is input into the image classifier that is established through training by sample visual word histograms arising from multiple sample images. An output result is used to determine a classification of the image for classification.

The pre-generated image classifier is generated through training based on sample visual word histograms established based on a large volume of sample images. The image classifier is generated based on a machine-learning algorithm based on each sample visual word histogram.

The following is an example generation process of the image classifier.

At a first step, based on a similarity relationship between each sample image feature and visual words in a pre-generated visual dictionary, each sample image feature is quantified by multiple visual words in the visual dictionary and a similarity coefficient between each sample image feature and each of the visual words after quantification is determined.

At a second step, the following operations are performed with respect to each sample image.

With respect to each sample image, the sample image is divided into multiple child sample images according to a pyramid image algorithm. Sample image features included in each child sample image are determined. Based on the sample similarity coefficient of each visual word corresponding to different sample image features in each sample child image, a weight of child sample corresponding to each child sample image is determined and the child sample visual word histogram is established.

Each of the child sample visual word histograms is combined to form the sample visual word histogram.

At a third step, based on each sample visual word histogram, through machine learning, the image classifier is generated through training.

In this example embodiment, the image for classification is divided into multiple child images in accordance with the pyramid image algorithm and then the child visual word histograms of the child images are established. The child visual word histograms are combined to form the classification visual word histogram. As each classification image feature may be classified by multiple visual words and the division of the child images also increases space information of the image feature, the finally established classification visual word histogram more accurately represents the image for classification, thereby improving the accuracy of image classification.

Figure 3:
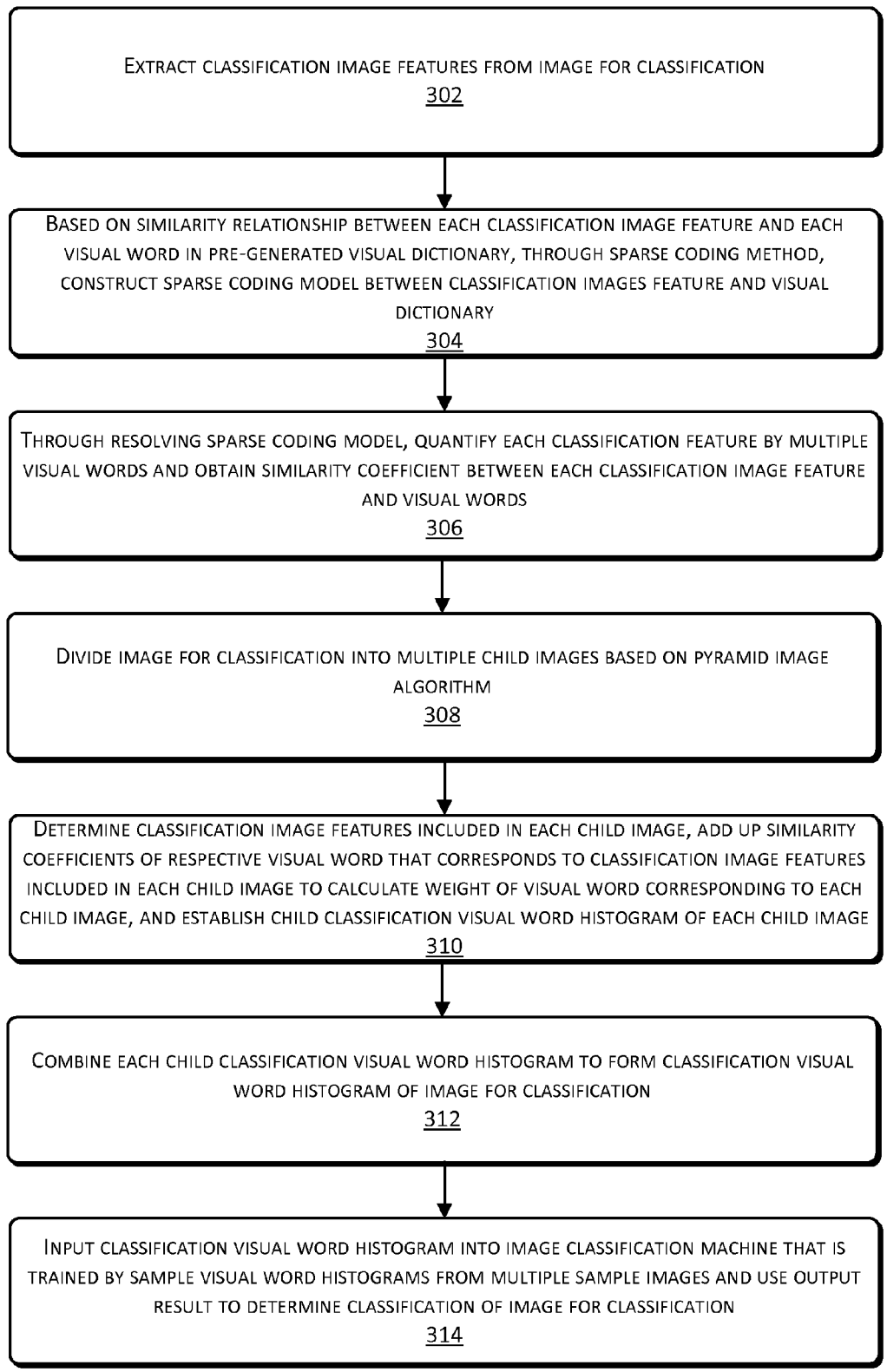
FIG. 3 illustrates a flowchart of another example method for classifying image in accordance with a third example embodiment of the present disclosure.

FIG. 3 illustrates a flowchart of another example method for classifying image in accordance with a third example embodiment of the present disclosure.

At 302, one or more classification image features of the image for classification are extracted.

At 304, based on a similarity relationship between each classification image feature and the one or more visual words in the pre-generated visual dictionary, through a sparse coding method, a sparse coding model between the classification image feature and the pre-generated visual dictionary is constructed. The sparse coding method is a multi-dimensional data description method that describes data based on a working principle that simulates human cerebral cortical visual neurons. Thus, its data description method is more accurate.

The similarity relationship between the classification image features and the visual words in the visual dictionary may be expressed as $X_i \approx B*C_i$. To more accurately calculate the value of $C_i$, this example embodiment, based on the sparse coding method, firstly forms the sparse coding model such as:

$$\arg_C{}^{min} \Sigma_{i=1}^N \|X_i - BC_i\| + \lambda \|C_i\|_{l^1}$$

Where B represents the visual dictionary that is a space dataset composed of multiple visual words, $X_i$ represents a respective classification image feature that is represented in a form of vector, $C_i$ represents a dataset formed by coefficients between the respective classification image feature and each visual word and is represented in a form of vector, N represents a number of classification image features, i=1, 2, ..., N, where N may be any integer, and $\lambda$ represents a constraining coefficient. In an example application, its value may be 500. $\|C_i\|_{l^1}$ represents a sum of all elements in $C_i$.

The meaning represented by the sparse coding model is to calculate the value of $C_i$ when the sparse coding model has a minimum value.

At 306, through resolving the sparse coding model, each classification image feature is quantified by multiple visual words in the visual dictionary and the similarity coefficient between each classification image feature and the visual words after the quantification is obtained.

A mathematical optimum method may be used to resolve the sparse coding model, such as a least square method. In an example of the least square method, the spare coding model is equivalent to $M = \Sigma_{i=1}^N \|X_i - BC_i\| + \lambda \|C_i\|_{l^1}$.

The least square method may be used to obtain the value of $C_i$ when M has a minimum value. The data in $C_i$ are the similarity coefficients between the classification image feature $X_i$ and each visual word in the visual dictionary.

For example, assuming that the visual dictionary B includes 4 visual words b1, b2, b3, and b4, for the classification image feature $X_1$, the resolved $C_1$ is {0, 0, 0.4, 0.6}, which represents that the classification image feature may be quantified as the visual words b3 and b4. The similarity coefficients with the visual words b3 and b4 are 0.4 and 0.6 respectively. The similarity coefficients with the other visual words that are not used for quantification, i.e., b1 and b2, are 0.

Through the sparse coding model, the similarity coefficient between each classification image feature and each visual word is determined. Each classification image feature is represented by a linear combination of multiple visual words. The sparse coding model is used to implement representation of each classification image feature through quantification of multiple visual words and to resolve the similarity coefficient, thereby more accurately representing the classification image feature.

At 308, the image for classification is divided into multiple child images according to the pyramid image algorithm.

At 310, the classification image features included in each child image are determined. The similarity coefficients of each visual word corresponding to different classification image features included in each child image are added up to calculate a weight of the visual word corresponding to each child image. The child visual word histogram of each child image is then established.

At 312, each child visual word histogram is combined to form the classification visual word histogram.

At 314, the classification visual word histogram is input into the image classifier that is established through training by sample visual word histograms arising from multiple sample images. An output result is used to determine a classification of the image for classification.

In this example embodiment, the pre-generated image classifier is generated through training based on sample visual word histograms established based on a large volume of sample images. The image classifier is generated based on a machine-learning algorithm based on each sample visual word histogram.

The following is an example generation process of the image classifier.

At a first step, based on a similarity relationship between each sample image feature and the one or more visual words in the pre-generated visual dictionary, through a sparse coding method, a sparse coding model between each sample image feature and the pre-generated visual dictionary is established.

At a second step, through resolving the sparse coding model, each sample image feature is quantified by multiple visual words in the visual dictionary and the sample similarity coefficient between each sample image feature and the visual words after quantification is obtained.

At a third step, the following operations are performed with respect to each sample image.

With respect to each sample image, the sample image is divided into multiple child sample images according to a pyramid image algorithm. Sample image features included in each child sample image are determined. Based on the sample similarity coefficient of each visual word corresponding to different sample image features in each sample child image, a weight of child sample corresponding to each child sample image is determined and the child sample visual word histogram is established.

Each of the child sample visual word histograms is combined to form the sample visual word histogram.

At a fourth step, based on each sample visual word histogram, through machine learning, the image classifier is generated through training.

This example embodiment, through the sparse coding model, quantifies each classification image feature by multiple visual words and resolves the similarity coefficients with the visual words after quantification, thereby improving the calculation accuracy of the similarity coefficient to accurately reflect the similarity relationship between the visual words and the image feature. In addition, the image for classification is divided according to the pyramid image algorithm, thereby increasing the space information of the features. Thus, the finally established classification visual word histogram more accurately represents the image for classification, thereby improving the accuracy of image classification.

Figure 4:
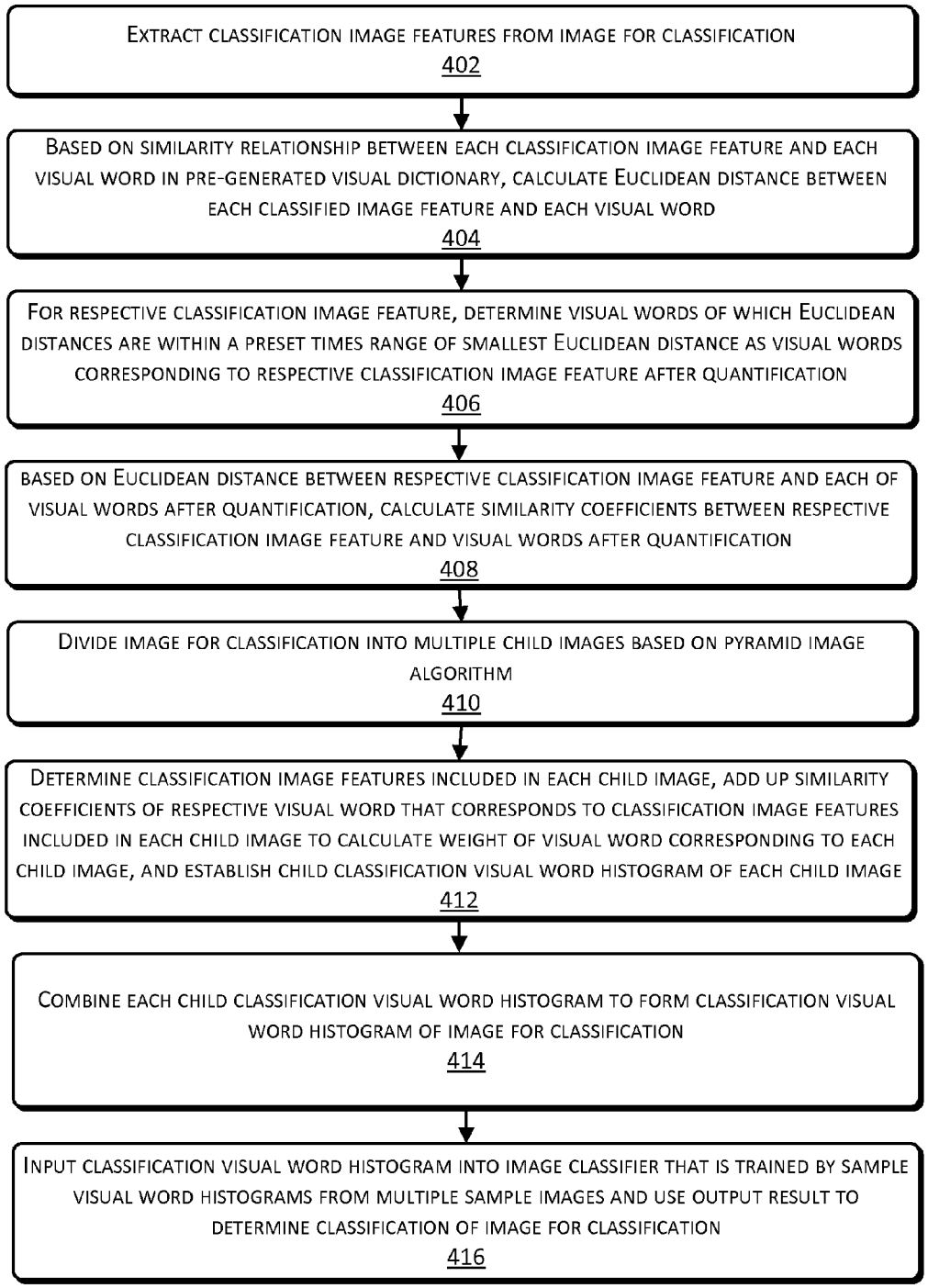
FIG. 4 illustrates a flowchart of another example method for classifying images in accordance with a fourth example embodiment of the present disclosure.

FIG. 4 illustrates a flowchart of another example method for classifying images in accordance with a fourth example embodiment of the present disclosure.

At 402, one or more classification image features of the image for classification are extracted.

At 404, based on the similarity relationship between each classification image feature and the visual words in the pre-generated visual dictionary, a Euclidean distance between each classification image feature and each visual word is calculated.

The similarity coefficient between the classification image feature and each visual word is determined by calculation of the Euclidean distance between each classification image feature and each visual word. Thus, according to the similarity relationship formula of the classification image features and the visual words, $X_i \approx B*C_i$, the Euclidean distance between Xi and each visual word in B is calculated to determine the value in $C_i$.

The image feature is represented in the form of a vector. For instance, SIFT feature is a 128-dimension vector. The visual words are clustered through image features and are also represented by vectors with the same dimensions of the image features. The Euclidean distance refers to a distance between two points in a multi-dimension space. In this example embodiment, the classification image feature and the visual word are treated as two points in the vector space. The Euclidean distance represents a similarity degree between the classification image feature and the visual word. The smaller the Euclidean distance, the more similarity there is between the visual word and the classification image feature.

For example, assuming that both the image feature and the visual word are 3-dimensional vectors, which are (1, 1, 3) and (2, 0, 5) respectively, the Euclidean distance is $\sqrt{(2-1)^2+(0-1)^2+(5-3)^2}=\sqrt{6}$ At 406, with respect to each classification image feature, one or more visual words of which Euclidean distances are within a preset times range of a smallest Euclidean distance are determined as the visual words corresponding to the respective classification image feature after quantification.

For example, the following operations may be performed for each classification image feature.

The smallest Euclidean distance among the Euclidean distances calculated based on the classification image feature is determined. A visual word that corresponds to the smallest Euclidean distance is treated as one visual word for quantification of the classification image feature.

The other calculated Euclidean distances based on the classification image feature are compared with the smallest Euclidean distance to determine the visual words of which the Euclidean distances are within a preset times range of the smallest Euclidean distance as the other visual words for quantification of the classification image feature.

The preset times range may be set based on actual situations. For example, the visual dictionary may include 5 visual words which are b1, b2, b3, b4, and b5. With respect to each classification image feature, the Euclidean distance with each of the visual words, i.e., b1, b2, b3, b4, b5, is 6, 4, 8, 2, and 10 respectively. The smallest Euclidean distance is 2. The differencing times of the other Euclidean distances compared with the smallest Euclidean distance are 2, 1, 3, and 4 respectively. If the preset times range is 1-4, the visual words b1, b2, b3, and b4 of which the corresponding Euclidean distance is 6, 4, 8, and 2 respectively are determined as the visual words for quantification of the classification image feature.

At 408, based on the Euclidean distance between the respective classification image feature and each of the visual words after quantification, the similarity coefficients between the respective classification image feature and the visual words after the quantification are calculated.

The similarity coefficients between the classification image features and the visual words in the visual dictionary that are not used for quantification are 0. Thus, the calculation of the similarity coefficients between the classification image feature and the visual word used for quantification may be sufficient.

The smaller the Euclidean distance is, the bigger the corresponding similarity coefficient is. There are multiple methods to use the Euclidean distance to calculate the similarity coefficient. Using the example at 406, the Euclidean distances between the classification image feature and the visual words for quantification are 6, 4, 8, and 2 respectively. The percentage relationship between the Euclidean distances is 0.3:0.2: 0.4:0.1. The smaller the Euclidean distance, the more similar there is between the classification image feature and the visual word. It is determined that the similarity coefficient between the classification image feature and the visual word b1 is 0.3, the similarity coefficient between the classification image feature and the visual word b2 is 0.2, the similarity coefficient between the classification image feature and the visual word b3 is 0.4, and the similarity coefficient between the classification image feature and the visual word b4 is 0.1. Thus, the similarity coefficients of the classification image feature corresponding to each visual word are 0.3, 0.2, 0.4, 0.1, and 0 respectively. 0 is the similarity coefficient between the classification image feature and the visual word b5.

The smaller the Euclidean distance is, the classification image feature and the visual word corresponding to the Euclidean distance is closer and, thus, the bigger the similarity coefficient is.

It should be noted that the specific values of the similar coefficients calculated through different methods may be different. As they still reflect the similarity degree between the visual word and the classification image feature, the classification accuracy is not affected.

At 410, the image for classification is divided into multiple child images in accordance with the pyramid image algorithm.

At 412, the classification image features included in each child image are determined. The similarity coefficients of each visual word corresponding to different classification image features included in each child image are added up to calculate a weight of the visual word corresponding to each child image. The child visual word histogram of each child image is then established.

At 414, each child visual word histogram is combined to form the classification visual word histogram.

At 416, the classification visual word histogram is input into the image classifier that is pre-generated through training. An output result is used to determine a classification of the image for classification.

In this example embodiment, the pre-generated image classifier is generated through training by sample visual word histograms established based on a large volume of sample images. The image classifier is generated by a machine-learning algorithm based on a large volume of sample visual word histograms.

The following is an example generation process of the image classifier.

At a first step, based on a similarity relationship between each sample image feature and the one or more visual words in the pre-generated visual dictionary, the Euclidean distance between each sample image feature and each visual word in the visual dictionary is calculated.

At a second step, with respect to each sample image feature, the visual word corresponding to the smallest Euclidean distance and other visual words of which their Euclidean distances are within the preset times range of the smallest Euclidean distance are determined.

At a third step, based on the Euclidean distance between each sample image feature and each visual word for quantification, the sample similarity coefficient between each sample image feature and each visual word for quantification is calculated.

At a fourth step, the following operations are performed with respect to each sample image.

With respect to each sample image, the sample image is divided into multiple child sample images according to a pyramid image algorithm. Sample image features included in each child sample image are determined. Based on the sample similarity coefficient of each visual word corresponding to different sample image features in each sample child image, a weight of child sample corresponding to each child sample image is determined and the child sample visual word histogram is established.

Each of the child sample visual word histograms is combined to form the sample visual word histogram.

At a fifth step, based on each sample visual word histogram, through machine learning, the image classifier is generated through training.

This example embodiment determines the similarity degree between the classification image feature and the visual word based on calculation of the Euclidean distance, quantifies the classification image feature into multiple visual words based on the calculated Euclidean distance, and determines the coefficient. As the classification image feature is quantified by multiple visual words, the established classification visual word histogram can more accurately represent the image for classification, thereby improving the accuracy of image classification. In addition, the image for classification is divided into multiple child images, thereby increasing the space information of the features. Thus, the finally established classification visual word histogram more accurately represents the image for classification, thereby improving the accuracy of image classification.

The above example embodiments, for the purpose of brevity, are described as a combination of a series of operations. One of ordinary skill in the art, however, would understand that the present disclosure is not limited by the sequence of the described operations. In accordance with the present disclosure, some operations may accept other sequences or be conducted in parallel. Further, one of ordinary skill in the art shall understand that the embodiments described herein are examples and their related operations and modules may be not necessary for the present disclosure.

Figure 5:
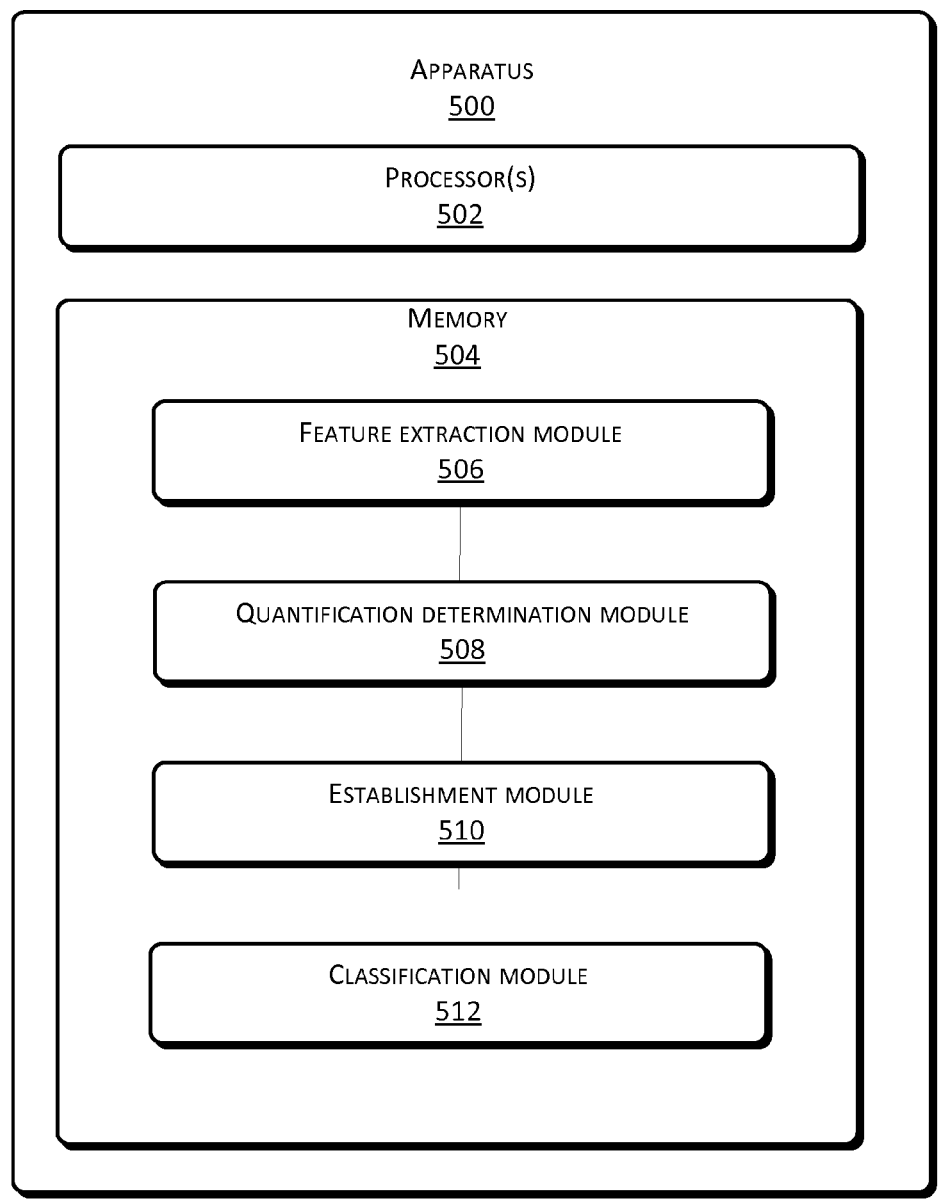
FIG. 5 illustrates a diagram of a first example apparatus for classifying images.

Corresponding to the method as described in the first example embodiment, FIG. 5 illustrates a diagram of a first example apparatus for classifying images.

The apparatus may include software, hardware, or a combination thereof. In an example configuration, the apparatus 500 in FIG. 5 may include one or more processor(s) 502 and memory 504. The memory 504 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves.

The memory 504 may store therein program units or modules and program data. In the example of FIG. 5, the memory 504 may store therein a feature extraction module 506, a quantification determination module 508, an establishment module 510, and a classification module 512.

The feature extraction module 506 extracts one or more classification image features of an image for classification. For example, the classification image features may be image regional features such as scale-invariant feature transform (SIFT) features extracted by a SIFT algorithm. The SFIT features have scale, rotation invariance, viewpoint change, affine change, and noises that also maintain certain extent of stability.

The quantification determination module 508, based on a similarity relationship between each classification image feature and each visual word in a pre-generated visual dictionary, quantifies each classification image feature by multiple visual words in the visual dictionary and determines a similarity coefficient between each classification image feature and each of the visual words after the quantification.

The visual dictionary may be generated in advance through clustering of sample image features extracted from a large volume of sample images.

As both the image features and the visual words may be represented by vectors, each classification image feature may have the following similar relationship with the visual words in the visual dictionary, which may be expressed in a linear formula such as $Xi \approx B*Ci$.

$Xi$ represents a respective image feature, B represents the visual dictionary, and $Ci$ represents a dataset composed of coefficients between each classification image feature and each visual word.

The establishment module 510, based on the similarity coefficient of each visual word that corresponds to different classification image features, determines a weight of each visual word to establish a classification visual word histogram.

For example, the establishment module 510 may add up all of the similarity coefficients of different classification image features corresponding to a respective visual word to calculate a respective weight of each visual word corresponding to the image for classification and establish the classification visual word histogram based on the weights.

In other words, the respective weight of each visual word is combined to form a dataset in the form of vector to obtain the classification visual word histogram.

The classification module 512 inputs the classification visual word histogram into an image classifier that is trained by sample visual word histograms established based on multiple sample images. An output result is used to determine a classification of the image for classification.

The image classifier is a machine model that automatically determines classifications of images after machine-learning. For example, the image classifier may be a vector-support machine model, a decision tree model, etc. The pre-generated image classifier is based on multiple sample images, uses a machine-learning algorithm, and generates a corresponding classification model to implement image classification.

The pre-generated image classifier is generated in advance through training based on sample visual word histograms established based on a large volume of sample images. For example, the operations to establish the sample visual word histograms may be the same as the operations to establish the visual word histogram of the image for classification to implement the image classification.

The generation process of the image classifier as described in this example embodiment may be referenced to the description in the first method example embodiment, which is not detailed herein for the purpose of brevity.

In this example embodiment of the present disclosure, each classification image feature is quantified by multiple visual words and similarity coefficients between each classification image feature and the visual words after quantification are determined. The visual word histogram is established based on different similarity coefficients of each visual word. As each classification image feature may be quantified by multiple visual words such that one classification image feature may be represented by multiple visual words, the accuracy of the classification image feature represented by the visual words is improved. Thus, the established classification visual word histogram may more accurately represent the image for classification, thereby improving the accuracy of image classification. In addition, as multiple visual words are used to represent the classification image feature, the classification error arising from quantification error may be reduced and the accuracy of image classification may be improved.

Figure 6:
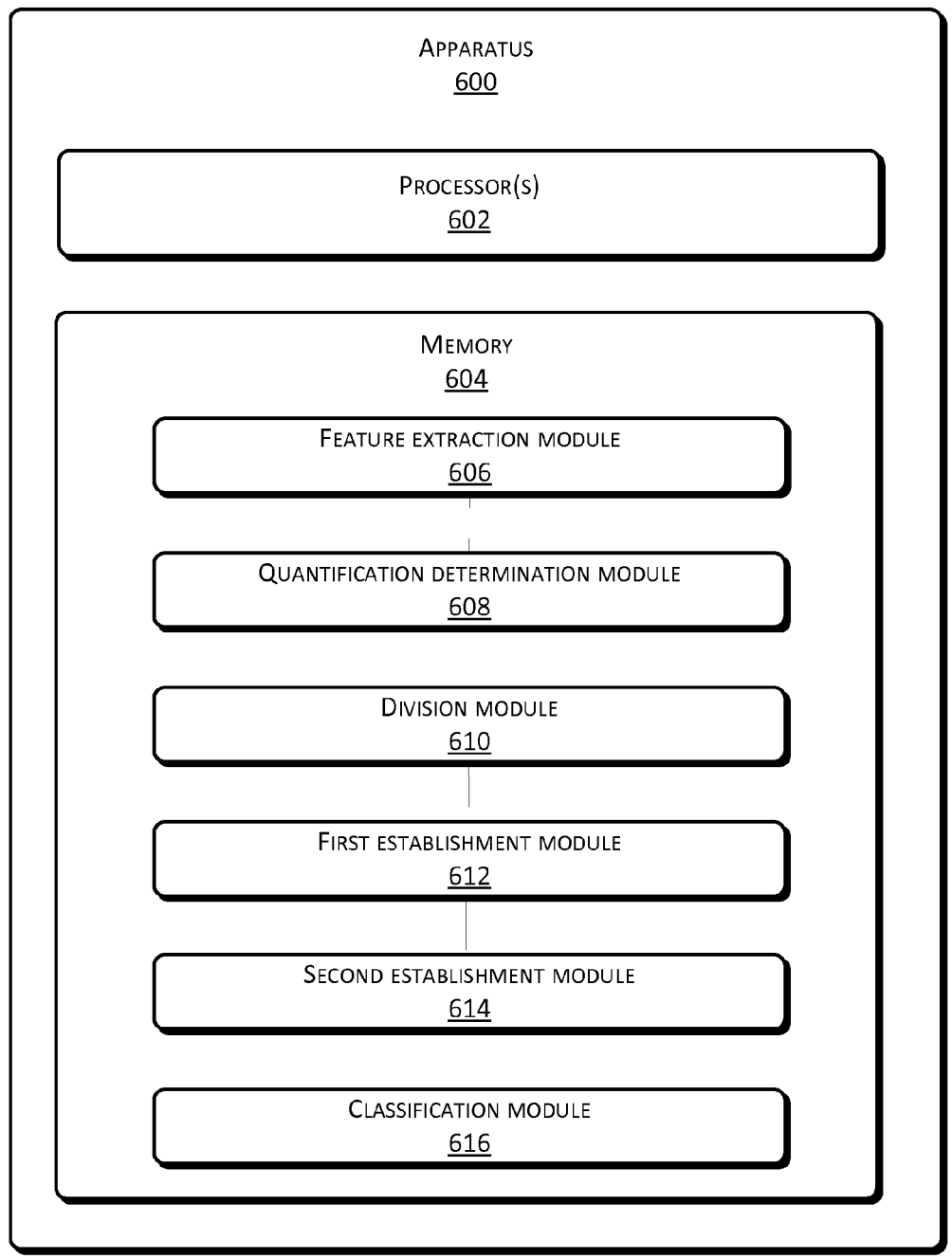
FIG. 6 illustrates a diagram of a second example apparatus for classifying images.

Corresponding to the method as described in the second example embodiment, FIG. 6 illustrates a diagram of a second example apparatus for classifying images.

The apparatus may include software, hardware, or a combination thereof. In an example configuration, the apparatus 600 in FIG. 6 may include one or more processor(s) 602 and memory 604. The memory 604 is an example of computer storage media.

The memory 604 may store therein program units or modules and program data. In the example of FIG. 6, the memory 604 may store therein a feature extraction module 606, a quantification determination module 608, a division module 610, a first establishment module 612, a second establishment module 614, and a classification module 616.

The feature extraction module 606 extracts one or more classification image features of an image for classification.

The quantification determination module 608, based on a similarity relationship between each classification image feature and each visual word in a pre-generated visual dictionary, quantifies each classification image feature by multiple visual words in the visual dictionary and determines a similarity coefficient between each classification image feature and each of the visual words after the quantification.

The division module 610 divides the image for classification into multiple child images according to a pyramid image algorithm. In order that the visual word histogram may represent space information of the image for classification, in this example embodiment, the image for classification is divided by spaces. The image for classification is divided into multi-layer space sub-regions. Each layer space sub-region is a space image. For each space image, the division for child image is performed to obtain multiple child images.

For example, the division module 610 may include an image layer division module and a child image division module. The image layer division module divides the image for classification into multiple layers image according to the pyramid image algorithm. The child image division module divides child images for each layer image to form multiple child images.

The first establishment module 612 determines the classification image features included in each child image, adds up the similarity coefficients of a respective visual word that corresponds to the classification image features included in each child, calculates a respective weight of each visual word corresponding to each child image that includes different classification image features, and establishes a child classification visual word histogram of each child image.

After the image division, the classification image features included in different child images at different layers are different. The extracted classification image features included in each child image are firstly determined. Then the child classification visual word histogram of each child image is established. For example, the establishing process of the child classification visual word histogram is the same as the establishing process to establish the classification visual word histogram. That is, the child weights of the visual words corresponding to each child image are calculated and the child classification visual word histogram is established based on the child weights.

The second establishment module 614 combines each of the child classification visual word histograms to form a classification visual word histogram.

As the child classification visual word histogram includes data values from multiple data and is represented by vector, the combination of each of the child classification visual word histograms is to combine data of each child classification visual word histogram to form a high-dimensional vector.

The division of layers of the image and the child image increases the space information of the image features or the location relationships between different feature points. Each child image may be represented by the child classification visual word histogram. The finally formed classification visual word histogram increases space information of the image for classification. Thus, the classification visual word histogram more accurately represents the image for classification, thereby further improving the accuracy of image classification.

The classification module 616 inputs the classification visual word histogram into an image classifier that is trained by sample visual word histograms established based on multiple sample images. An output result is used to determine a classification of the image for classification.

The pre-generated image classifier is generated in advance through training based on sample visual word histograms established based on a large volume of sample images. The image classifier is generated based on a machine-learning algorithm based on each sample visual word histogram. The detailed generation process may be referenced to the second example embodiments, and is not detailed herein.

In this example embodiment, the image for classification is divided into multiple child images in accordance with the pyramid image algorithm and then the child visual word histograms of the child images are established. The child visual word histograms are combined to form the classification visual word histogram. As each classification image feature may be classified by multiple visual words and the division of the child images also increases space information of the image feature, the finally established classification visual word histogram more accurately represents the image for classification, thereby improving the accuracy of image classification.

Figure 7:
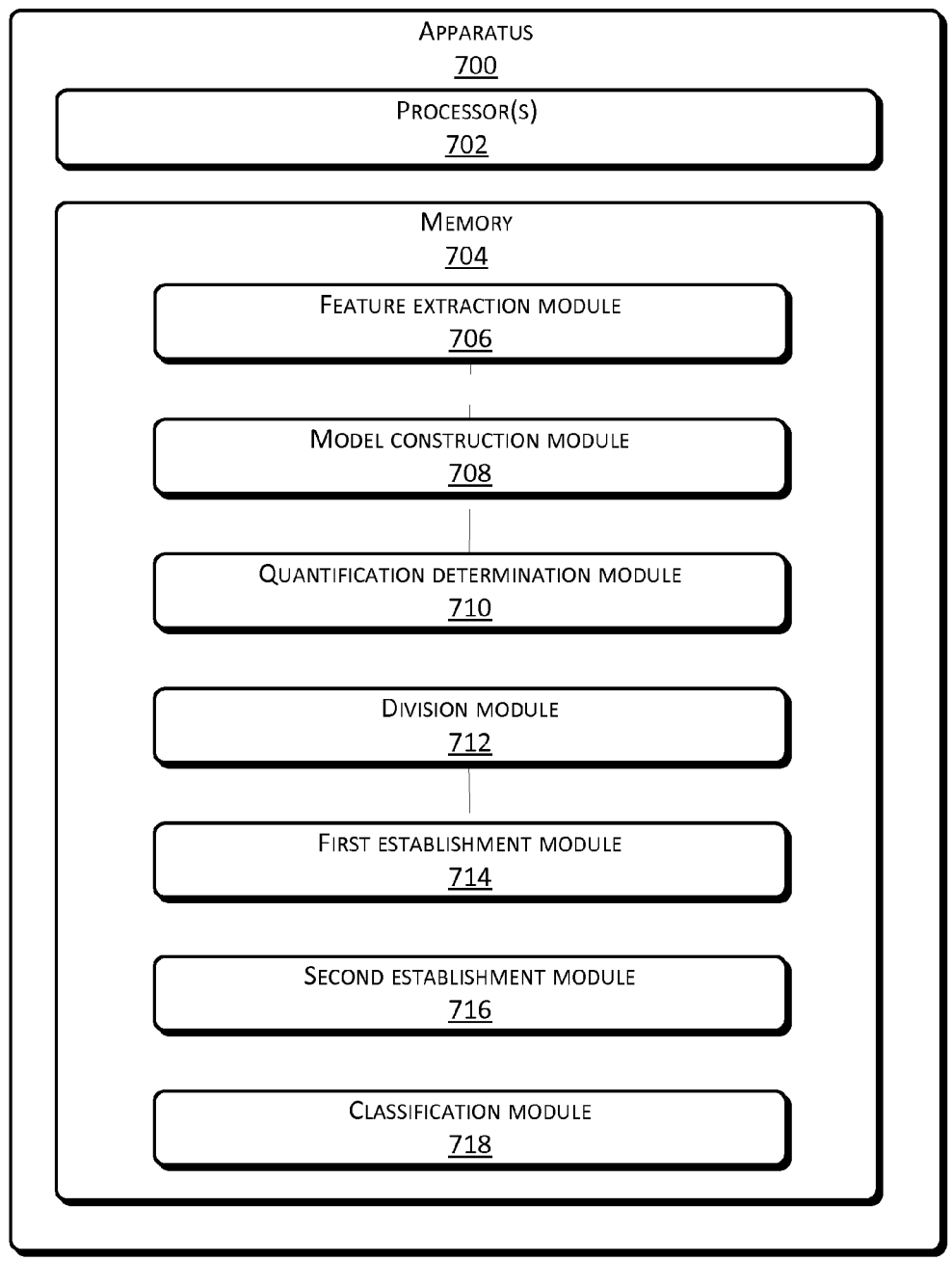
FIG. 7 illustrates a diagram of a third example apparatus for classifying images.

Corresponding to the method as described in the third example embodiment, FIG. 7 illustrates a diagram of a third example apparatus for classifying images.

The apparatus may include software, hardware, or a combination thereof. In an example configuration, the apparatus 700 in FIG. 7 may include one or more processor(s) 702 and memory 704. The memory 704 is an example of computer storage media.

The memory 704 may store therein program units or modules and program data. In the example of FIG. 7, the memory 704 may store therein a feature extraction module 706, a model construction module 708, a quantification calculation module 710, a division module 712, a first establishment module 714, a second establishment module 716, and a classification module 718.

The feature extraction module 706 extracts one or more classification image features of an image for classification.

The model construction module 708, based on a similarity relationship between each classification image feature and the one or more visual words in the pre-generated visual dictionary, through a sparse coding method, constructs a sparse coding model between the classification image feature and the pre-generated visual dictionary.

For example, the sparse coding model may be as follows $$\arg_C{}^{min}\Sigma_{i=1}^N\|X_i-BC_i\|+\lambda\|C_i\|_1$$

Where B represents the visual dictionary, $X_i$ represents a respective classification image feature that is represented in a form of vector, $C_i$ represents a dataset formed by coefficients between the respective classification image feature and each visual word and is represented in a form of vector, N represents a number of classification image features, i=1, 2, ..., N, where N may be any integer, and $\lambda$ represents a constraining coefficient. The sparse coding model is to calculate the value of $C_i$ when the sparse coding model has a minimum value.

The quantification calculation module 710, through resolving the sparse coding model, quantifies each classification image feature by multiple visual words in the visual dictionary and obtains the similarity coefficient between each classification image feature and the visual words after the quantification.

A mathematical optimum method may be used to resolve the sparse coding model, such as a least square method that calculates the value of $C_i$ when the sum of square of deviations of $X_i$ and $BC_i$ has a minimum value.

The division module 712 divides the image for classification into multiple child images according to a pyramid image algorithm.

For example, the division module 712 may include an image layer division module and a child image division module. The image layer division module divides the image for classification into multiple layers image according to the pyramid image algorithm. The child image division module divides child images for each layer image to form multiple child images.

The first establishment module 714 determines the classification image features included in each child image, adds up the similarity coefficients of a respective visual word that corresponds to the classification image features included in each child, calculates a respective weight of each visual word corresponding to each child image that includes different classification image features, and establishes a child classification visual word histogram of each child image.

The second establishment module 716 combines each of the child classification visual word histograms to form a classification visual word histogram.

The classification module 718 inputs the classification visual word histogram into an image classifier that is generated in advance by training. An output result is used to determine a classification of the image for classification.

This example embodiment, through the sparse coding model, quantifies each classification image feature by multiple visual words and resolves the similarity coefficients with the visual words after quantification, thereby improving the calculation accuracy of data expression. In addition, the image for classification is divided according to the pyramid image algorithm, thereby increasing the space information of the features. Thus, the finally established classification visual word histogram more accurately represents the image for classification, thereby improving the accuracy of image classification.

Figure 8:
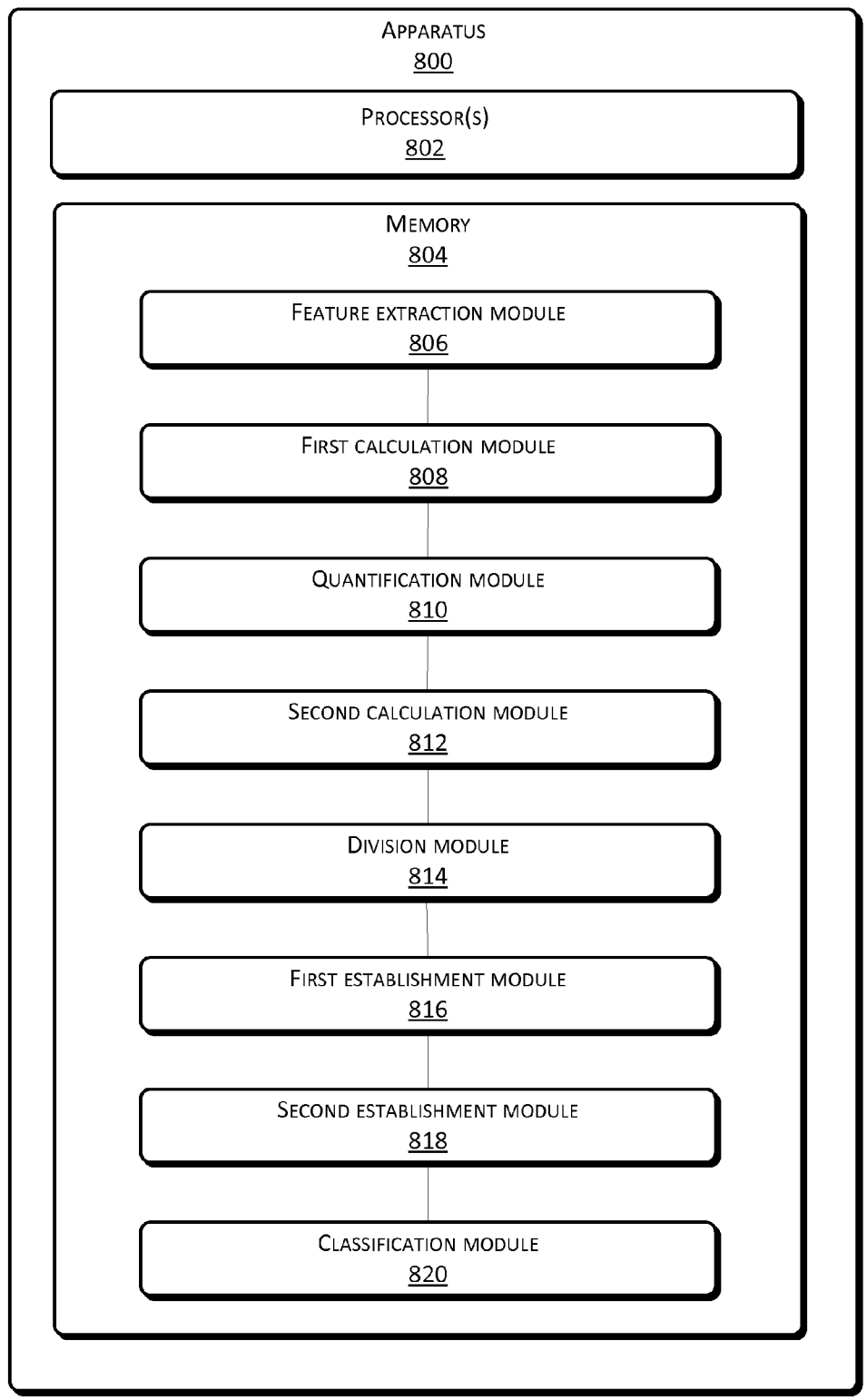
FIG. 8 illustrates a diagram of a fourth example apparatus for classifying images.

Corresponding to the method as described in the fourth example embodiment, FIG. 8 illustrates a diagram of a fourth example apparatus for classifying images.

The apparatus may include software, hardware, or a combination thereof. In an example configuration, the apparatus 800 in FIG. 8 may include one or more processor(s) 802 and memory 804. The memory 804 is an example of computer storage media.

The memory 804 may store therein program units or modules and program data. In the example of FIG. 8, the memory 804 may store therein a feature extraction module 806, a first calculation module 808, a quantification module 810, a second calculation module 812, a division module 814, a first establishment module 816, a second establishment module 818, and a classification module 820.

The feature extraction module 806 extracts one or more classification image features of an image for classification.

The first calculation module 808, based on the similarity relationship between each classification image feature and the visual words in the pre-generated visual dictionary, calculates a Euclidean distance between each classification image feature and each visual word.

The image feature is represented in the form of vector. For instance, SIFT feature is a 128-dimension vector. The visual words are clustered through image features and are also represented by vectors with same dimensions of the image features. The Euclidean distance refers to a distance between two points in a multi-dimension space. In this example embodiment, the classification image feature and the visual word are treated as two points in the vector space. The Euclidean distance represents a similarity degree between the classification image feature and the visual word.

The quantification module 810, with respect to each classification image feature, determines one or more visual words of which Euclidean distances are within a preset times range of a smallest Euclidean distance as the visual words corresponding to the respective classification image feature after the quantification.

The second calculation module 812, based on the Euclidean distance between the respective classification image feature and each of the visual words after the quantification, calculates the similarity coefficients between the respective classification image feature and the visual words after the quantification.

The smaller the Euclidean distance is, the larger its corresponding similarity coefficient is.

The division module 814 divides the image for classification into multiple child images according to a pyramid image algorithm.

For example, the division module 814 may include an image layer division module and a child image division module. The image layer division module divides the image for classification into multiple layers image according to the pyramid image algorithm. The child image division module divides child images for each layer image to form multiple child images.

The first establishment module 816 determines the classification image features included in each child image, adds up the similarity coefficients of a respective visual word that corresponds to the classification image features included in each child, calculates a respective weight of each visual word corresponding to each child image that includes different classification image features, and establishes a child classification visual word histogram of each child image.

The second establishment module 818 combines each of the child classification visual word histograms to form a classification visual word histogram.

The classification module 820 inputs the classification visual word histogram into an image classifier that is trained by sample visual word histograms established based on multiple sample images. An output result is used to determine a classification of the image for classification.

This example embodiment determines the similarity degree between the classification image feature and the visual word based on calculation of the Euclidean distance, quantifies the classification image feature into multiple visual words based on the calculated Euclidean distance, and determines the coefficient. As the classification image feature is quantified by multiple visual words, the established classification visual word histogram can more accurately represent the image for classification, thereby improving the accuracy of image classification. In addition, the image for classification is divided into multiple child images, thereby increasing the space information of the features. Thus, the finally established classification visual word histogram more accurately represents the image for classification, thereby improving the accuracy of image classification.

The various exemplary embodiments are progressively described in the present disclosure. The same or similar portions of the example embodiments can be mutually referenced. Each example embodiment has a different focus than other example embodiments. In particular, the example apparatus embodiments have been described in a relatively simple manner because of its fundamental correspondence with the example methods. Details thereof can be referred to related portions of the exemplary methods.

It is noted that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants mean non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

For the purpose of illustration, the above apparatuses are described in different modules according to the functionalities. Certainly, the present techniques may implement the functionalities of multiple modules in one or more hardware, software, or in combination of both From the descriptions of the example embodiments, one of ordinary skill in the art may understand that the present techniques may be implemented through software and necessary general platforms. The present techniques may be embodied in the form of software products. For example, the present disclosure can be in a form of one or more computer programs containing the computer-executable or processor-executable instructions that can be implemented in the computer storage medium (including but not limited to disks, CD-ROM, optical disks, etc.). These computer program instructions can also be loaded in a computer or other programmable data processors, so that the computer or other programmable data processors can perform the methods described in the example embodiments.

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

The present disclosure describes example methods and apparatuses for classifying images. The example embodiments are merely for illustrating the present disclosure and are not intended to limit the scope of the present disclosure. It should be understood for persons in the technical field that certain modifications and improvements can be made and should be considered under the protection of the present disclosure without departing from the principles of the present disclosure.

What is claimed is:

1. A method performed by one or more processors configured with computer-executable instructions, the method comprising:

extracting one or more classification image features from an image for classification;

quantifying, based on a similarity relationship between each classification image feature and each visual word in a pre-generated visual dictionary, each classification image feature by multiple visual words in the visual dictionary and determining a similarity coefficient between each classification image feature and each visual word after the quantifying;

determining, based on one or more similarity coefficients of each visual word corresponding to different classification image features, a weight of each visual word to establish a classification visual word histogram;

inputting the classification visual word histogram into an image classifier; and using an output of the inputting to determine a classification of the image for classification, wherein the quantifying each classification image feature by multiple visual words in the visual dictionary and determining the similarity coefficient between each classification image feature and each visual word after the quantifying includes:

calculating, based on the similarity relationship between each classification image feature and the visual words in the pre-generated visual dictionary, a Euclidean distance between each classification image feature and each visual word, determining a smallest Euclidean distance among calculated Euclidean distances, determining, with respect to each classification image feature, one or more visual words of which Euclidean distances are within a preset times range of the smallest Euclidean distance as the visual words for quantification of the respective classification image feature, and calculating, based on the Euclidean distance between the respective classification image feature and each of the visual words for quantification, the one or more similarity coefficients between the respective classification image feature and the visual words, the one or more similarity coefficients being calculated respectively as a percentage relationship of each of the one or more visual words for quantification, wherein the percentage relationship of a particular visual word for quantification is calculated by dividing the respective Euclidean distance of the particular visual word for quantification by a sum total of the Euclidean distances of the one or more visual words for quantification.

2. The method as recited in claim 1, wherein the image classifier is generated through training by sample visual word histograms from multiple sample images.

3. The method as recited in claim 2, further comprising comparing, after inputting the classification visual word histogram into an image classifier, the inputted classification visual word histogram to a pre-generated classification visual word histogram in the image classifier to determine a classification of the image for classification.

4. The method as recited in claim 1, wherein the determining the weight of each visual word to establish the classification visual word histogram comprises:
adding up the one or more coefficients of a respective visual word that correspond to different classification image features to calculate the weight of the respective visual word; and
establishing the classification visual word histogram.

5. The method as recited in claim 1, wherein the determining the weight of each visual word to establish the classification visual word histogram comprises:
dividing the image for classification into multiple layer images based on a pyramid image algorithm; and
dividing each layer image to form multiple child images.

6. The method as recited in claim 1, wherein the visual dictionary is generated through clustering of multiple sample image features extracted from multiple sample images.

7. The method as recited in claim 1, wherein the classification visual word histogram increases space information of the image for classification.

8. A system comprising:
one or more processors; and
memory containing computer readable media storing one or more modules including instructions, which when executed by the processors, cause the modules to perform:
extracting one or more classification image features from an image for classification,
quantifying, based on a similarity relationship between each classification image feature and each visual word in a pre-generated visual dictionary, each classification image feature by multiple visual words in the visual dictionary and determining a similarity coefficient between each classification image feature and each visual word after the quantifying,
determining, based on one or more similarity coefficients of each visual word corresponding to different classification image features, a weight of each visual word to establish a classification visual word histogram, and
inputting the classification visual word histogram into an image classifier and using an output to determine a classification of the image for classification,
wherein the quantifying includes:
calculating, based on the similarity relationship between each classification image feature and the visual words in the pre-generated visual dictionary, a Euclidean distance between each classification image feature and each visual word,
determining a smallest Euclidean distance among calculated Euclidean distances and, with respect to each classification image feature, determining one or more visual words of which Euclidean distances are within a preset times range of the smallest Euclidean distance as the visual words for quantification of the respective classification image feature, and
calculating, based on the Euclidean distance between the respective classification image feature and each of the visual words for quantification, the one or more similarity coefficients between the respective classification image feature and the visual words, the one or more similarity coefficients being calculated respectively as a percentage relationship of each of the one or more visual words for quantification, and
wherein the percentage relationship of a particular visual word for quantification is calculated by dividing the respective Euclidean distance of the particular visual word for quantification by a sum total of the Euclidean distances of the one or more visual words for quantification.

9. The apparatus as recited in claim 8, wherein the image classifier is generated through training by sample visual word histograms from multiple sample images.

10. The apparatus as recited in claim 9, wherein the image classifier compares the inputted classification visual word histogram with a pre-generated classification visual word histogram to determine a classification of the image for classification.

11. The apparatus as recited in claim 8, wherein the determining a weight of each visual word includes:
dividing the image for classification into multiple child images based on a pyramid image algorithm,
determining classification image features of each child image,
adding the coefficients of a respective visual word that correspond to each classification image features in a respective child image,
calculating the weight of the respective visual word corresponding to the respective child image to establish a child classification visual word histogram of the respective child image, and
combining each child classification visual word histogram of each child image to establish the classification visual word histogram.

12. The apparatus as recited in claim 8, wherein the classification visual word histogram increases space information of the image for classification.

13. One or more computer storage media including processor-executable instructions that, when executed by one or more processors, direct the one or more processors to perform a method comprising:
extracting one or more classification image features from an image for classification;
quantifying, based on a similarity relationship between each classification image feature and each visual word in a pre-generated visual dictionary, each classification image feature by multiple visual words in the visual dictionary and determining a similarity coefficient between each classification image feature and each visual word after the quantifying;
determining, based on one or more similarity coefficients of each visual word corresponding to different classification image features, a weight of each visual word to establish a classification visual word histogram;
inputting the classification visual word histogram into an image classifier that is generated through training by sample visual word histograms from multiple sample images; and
using an output of the inputting to determine a classification of the image for classification, wherein the quantifying each classification image feature by multiple visual words in the visual dictionary and determining the similarity coefficient between each classification image feature and each visual word after the quantifying includes:

calculating, based on the similarity relationship between each classification image feature and the visual words in the pre-generated visual dictionary, a Euclidean distance between each classification image feature and each visual word, determining a smallest Euclidean distance among calculated Euclidean distances, determining, with respect to each classification image feature, one or more visual words of which Euclidean distances are within a preset times range of the smallest Euclidean distance as the visual words for quantification of the respective classification image feature, and calculating, based on the Euclidean distance between the respective classification image feature and each of the visual words for quantification, the one or more similarity coefficients between the respective classification image feature and the visual words, the one or more similarity coefficients being calculated respectively as a percentage relationship of each of the one or more visual words for quantification, wherein the percentage relationship of a particular visual word for quantification is calculated by dividing the respective Euclidean distance of the particular visual word for quantification by a sum total of the Euclidean distances of the one or more visual words for quantification.

14. The one or more computer storage media as recited in claim 13, wherein the method further comprises comparing, after inputting the classification visual word histogram into an image classifier, the inputted classification visual word histogram to a pre-generated classification visual word histogram in the image classifier to determine a classification of the image for classification.

15. The one or more computer storage media as recited in claim 13, wherein the classification visual word histogram increases space information of the image for classification.

* * * * *